(12) United States Patent
Zimmer et al.

(10) Patent No.: US 7,779,244 B2
(45) Date of Patent: Aug. 17, 2010

(54) MULTI-SOCKET BOOT

(75) Inventors: Vincent J. Zimmer, Federal Way, WA (US); Michael A. Rothman, Puyallup, WA (US); Mallik Bulusa, Olympia, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 11/647,542

(22) Filed: Dec. 28, 2006

(65) Prior Publication Data

US 2008/0162878 A1 Jul. 3, 2008

(51) Int. Cl.
G06F 15/177 (2006.01)
(52) U.S. Cl. .............................. 713/2; 713/1; 712/203
(58) Field of Classification Search ................ 713/1, 713/2; 712/203
See application file for complete search history.

(56) References Cited

U.S. PATENT DOCUMENTS 6,336,185 B1 * 1/2002 Sargenti et al. ............... 713/2

2003/0120909 A1 * 6/2003 Zimmer et al. ............... 713/2
2004/0215951 A1 * 10/2004 Chen et al. .................... 713/1
2005/0086667 A1 * 4/2005 Jin et al. ....................... 719/327

* cited by examiner

Primary Examiner—Thuan N Du
(74) Attorney, Agent, or Firm—Joni Stutman

(57) ABSTRACT

In some embodiments, the invention involves a system and method to provide maximal boot-time parallelism for future multi-core, multi-node, and many-core systems. In an embodiment, the security (SEC), pre-EFI initialization (PEI), and then driver execution environment (DXE) phases are executed in parallel on multiple compute nodes (sockets) of a platform. Once the SEC/PEI/DXE phases are executed on all compute nodes having a processor, the boot device select (BDS) phase completes the boot by merging or partitioning the compute nodes based on a platform policy. Partitioned compute nodes each run their own instance of EFI. A common memory map may be generated prior to operating system (OS) launch when compute nodes are to be merged. Other embodiments are described and claimed.

27 Claims, 8 Drawing Sheets

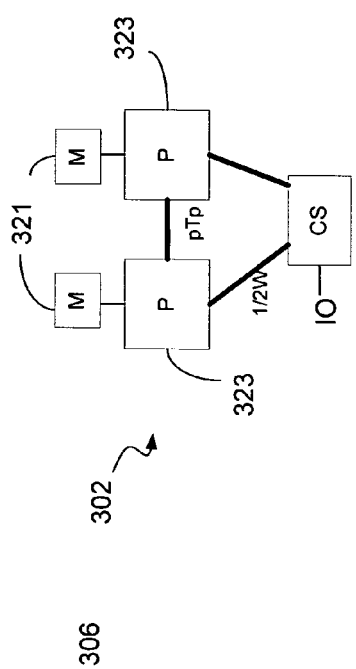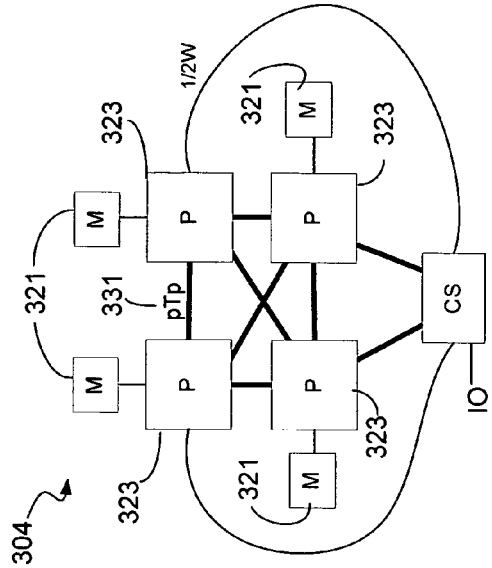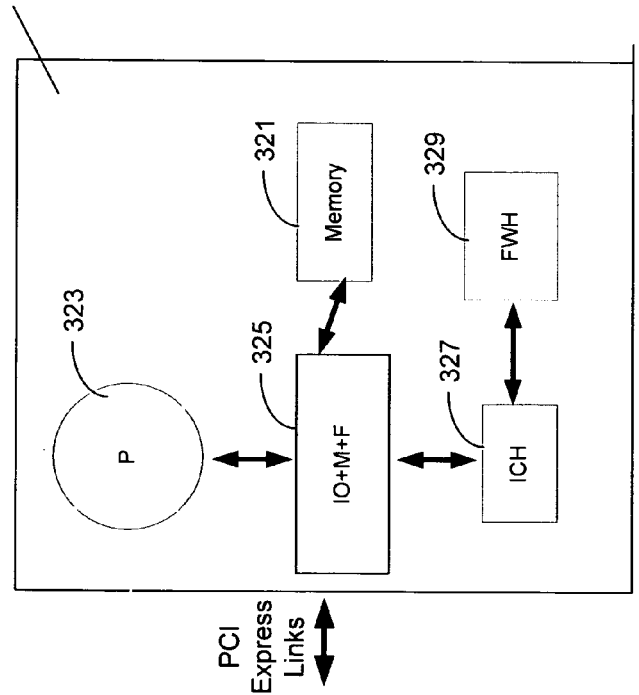

MULTI-SOCKET BOOT

FIELD OF THE INVENTION

An embodiment of the present invention relates generally to computing systems and, more specifically, a system and method to provide maximal boot-time parallelism for future multi-core, multi-node, and many-core systems.

BACKGROUND INFORMATION

Various mechanisms exist for speeding boot times in a computing platform. Platform architecture may have a direct impact on boot times. Platforms having multi-processor or multi-core architecture may present unique challenges during boot. Platforms having a point to point interconnect (pTp) architecture also require great reliability at boot time.

Processors in a multi-processor (MP) system may be connected with a multi-drop bus or a point-to-point interconnection network. A point-to-point interconnection network may provide fill connectivity in which every processor is directly connected to every other processor in the system. A point-to-point interconnection network may alternatively provide partial connectivity in which a processor reaches another processor by routing through one or more intermediate processors. A large-scale, partitionable, distributed, symmetric multiprocessor (SMP) system may be implemented using AMD® Opteron™ processors as building blocks. Glueless SMP capabilities of Opteron processors may scale from 8 sockets to 32 sockets. Implementations may use a high-throughput, coherent HyperTransport™ (cHT) protocol handling using multiple protocol engines (PE) and a pipelined design. Other implementations may use processors available for future systems from Intel Corporation that utilize a pTp interconnect in a platform having extensible firmware interface (EFI) architecture.

Each processor in a MP system typically has a local cache to store data and code most likely to be reused. To ensure cache coherency, processors need to be informed of any transactions that may alter the coherency states of the data items in their local caches. One approach to cache coherency is directory-based where a centralized directory keeps track of all memory transactions that may alter the coherency states of the cached items. A coherency state indicates whether a data item is modified by a processor (the "M" state), exclusively owned by a processor (the "E" state), shared by multiple processors (the "5" state), or invalidated (the "I" state). The implementation of a directory often incurs substantial hardware cost.

Another approach to cache coherency is based on message exchanges among processors. For example, processors may exchange snoop messages to notify other processors of memory transactions that may alter the coherency states of cached data items. In a bus-connected MP system when a processor fetches a data item from main memory, all of the other processors can snoop the common bus at the same time. In a point-to-point interconnection network, a processor sends snoop messages to all the other processors when it conducts a memory transaction, Snoop messages can be sent directly from one processor to all the other processors in a fully-connected point-to-point interconnection network. However, to save hardware cost, a typical point-to-point interconnection network often provides partial connectivity which does not provide direct links between all processors.

BRIEF DESCRIPTION OF THE DRAWINGS

The features and advantages of the present invention will become apparent from the following detailed description of the present invention in which:

FIGS. 3A-C are multiple embodiments of a system as utilized by multiple embodiments;

DETAILED DESCRIPTION

An embodiment of the present invention is a system and method which addresses the problem of how to maintain reasonable boot-times and reliabilities in ever larger system fabrics, such as those enabled by the a point to point interconnect (pTp) architecture. Embodiments of the invention address the scaling problem by leveraging the advances in firmware technology, such as the Intel® Platform Innovation Framework for EFI, to decompose the boot flow to a local, node level initialization, deferring the "joining" of the system fabric until as late as possible. This joining may be required to build a single-single image, symmetric multiprocessor (SMP) topology. Alternatively, embodiments of the invention will allow for a late decision not to include a node for various policy reasons, i.e., errant node or sequestered node for an embedded IT or classical partitioning scenario.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

An exemplary method, apparatus, and system for system level initialization for a high speed point to point network (pTp) are described. In the following description, for purposes of explanation, numerous details are set forth in order to provide a thorough understanding of the present invention. However, it will be apparent to one skilled in the art that these specific details are not required in order to practice the present invention.

An area of current technological development relates to reliability, availability, and serviceability (RAS). Current systems based on the Front Side Bus (FSB) architecture do not permit hot plug of an individual bus component. Likewise, the current systems suffer from pin limitation, due to conveying initialization values and also suffer from performing multiple warm resets due to initial Power-On Configuration (POC) values are incorrect.

Figure 1:
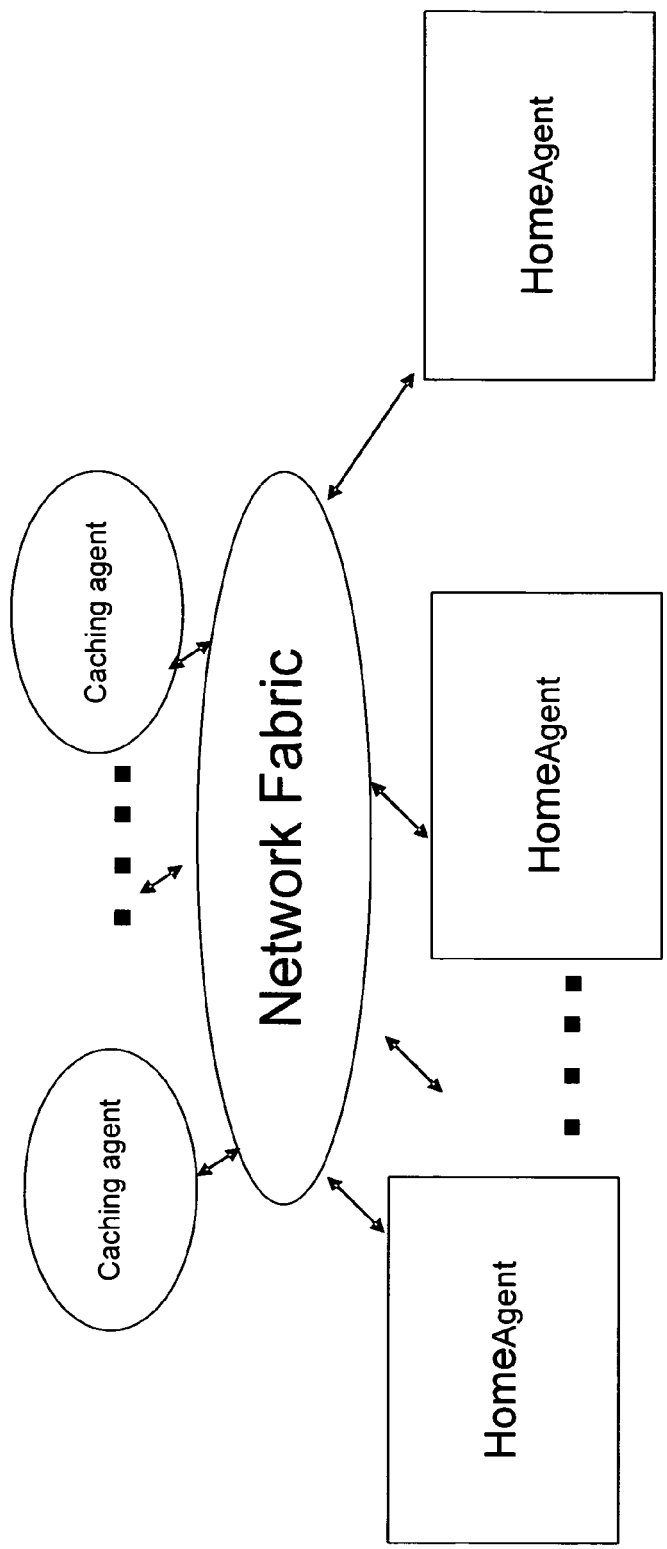
FIG. 1 is a protocol architecture as utilized by one embodiment.

In an embodiment, the pTp architecture supports a layered protocol scheme, which is discussed further, below. FIG. 1 illustrates one example of a cache coherence protocol's abstract view of the underlying network.

FIG. 1 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, or a transport layer. The fabric facilitates transporting messages from one protocol (home or caching agent) to another protocol for a point to point network. In one aspect, the figure depicts a cache coherence protocol's abstract view of the underlying network.

Figure 2:
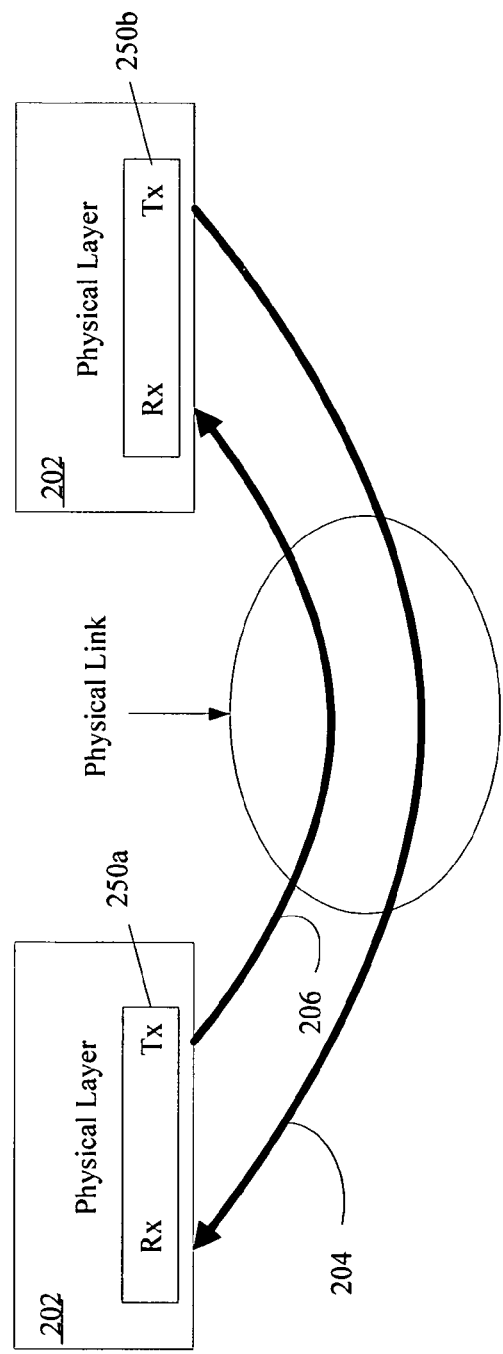
FIG. 2 is a block diagram of an apparatus for a physical interconnect utilized in accordance with the claimed subject matter.

FIG. 2 is a block diagram of an apparatus for a physical interconnect utilized in accordance with embodiments of the invention described herein. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 204 from a first transmit port 250*a* of a first integrated device to a first receiver port 250*b* of a second integrated device. Likewise, a second unidirectional link 206 from a first transmit port 250*b* of the second integrated device to a first receiver port 250*a* of the first integrated device. However, the claimed subject matter is not limited to two uni-directional links. One skilled in the art will appreciate the claimed subject matter supports any known signaling techniques, such as, bi-directional links, etc.

FIGS. 3A-C depict a point to point system with one or more processors. The claimed subject matter comprises several embodiments, one with one processor 306 (FIG. 3A), one with two processors (P) 302 (FIG. 3B) and one with four processors (P) 304 (FIG. 3C). In embodiments 302 and 304, each processor is coupled to a memory (M) 321 and is connected to each processor 323 via a network fabric which may comprise either or all of: a link layer, a protocol layer, a routing layer, a transport layer, and a physical layer. The fabric facilitates transporting messages from one protocol (home or caching agent) to another protocol for a point to point network. As previously described, the system of a network fabric supports any of the embodiments depicted in connection with FIGS. 1-3.

For embodiment 306, the uni-processor P 323 is coupled to graphics and memory control 325, depicted as IO+M+F, via a network fabric link that corresponds to a layered protocol scheme. The graphics and memory control is coupled to memory and is capable of receiving and transmitting via peripheral component interconnect (PCI) Express Links. Likewise, the graphics and memory control is coupled to the input/output controller hub (ICH) 327. Furthermore, the ICH 327 is coupled to a firmware hub (FWH) 329 via a low pin count (LPC) bus. Also, for a different uni-processor embodiment, the processor would have external network fabric links. The processor may have multiple cores with split or shared caches with each core coupled to an X-bar router and a non-routing global links interface. An X-bar router is a pTp interconnect between cores in a socket. X-bar is a "cross-bar" meaning that every element has a cross-link or connection to every other. This is typically faster than a pTp interconnect link and implemented on-die, promoting parallel communication. Thus, the external network fabric links are coupled to the X-bar router and a non-routing global links interface.

An embodiment of a multi-processor system comprises a plurality of processing nodes 323 interconnected by a point-to-point network 331 (indicated by thick lines between the processing nodes). For purposes of this discussion, the terms "processing node" and "compute node" are used interchangeably. Links between processors are typically full, or maximum, width, and links from processors to an IO hub (IOH) chipset (CS) are typically half width. Each processing node 323 includes one or more central processors 323 coupled to an associated memory 321 which constitutes main memory of the system. In alternative embodiments, memory 321 may be physically combined to form a main memory that is accessible by all of processing nodes 323. Each processing node 323 may also include a memory controller 325 to interface with memory 321. Each processing node 323 including its associated memory controller 325 may be implemented on the same chip. In alternative embodiments, each memory controller 325 may be implemented on a chip separate from its associated processing node 323.

Each memory 321 may comprise one or more types of memory devices such as, for example, dual in-line memory modules (DIMMs), dynamic random access memory (DRAM) devices, synchronous dynamic random access memory (SDRAM) devices, double data rate (DDR) SDRAM devices, or other volatile or non-volatile memory devices suitable for server or general applications.

The system may also include one or more input/output (I/O) controllers 327 to provide an interface for processing nodes 323 and other components of system to access to I/O devices, for instance a flash memory or firmware hub (FWH) 329. In an embodiment, each I/O controller 327 may be coupled to one or more processing nodes. The links between I/O controllers 327 and their respective processing nodes 323 are referred to as I/O links. I/O devices may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. I/O devices may be wire-lined or wireless. In one embodiment, I/O devices may include a wireless transmitter and a wireless transmitter receiver.

The system may be a server, a multi-processor desktop computing device, an embedded system, a network device, or a distributed computing device where the processing nodes are remotely connected via a wide-area network.

In the embodiment as shown in FIG. 3C, network 331 provides partial connectivity for processing nodes 323. Thus, every processing node 323 is directly connected to some, but perhaps not all, of the other processing nodes. A processing node 323 is connected to another processing node via a direct link or via an indirect connection (e.g., using another processor as a go-between).

A type of message carried by network 331 is a snoop message, which contains information about a memory transaction that may affect the coherency state of a data item in caches (not shown). A memory transaction refers to a transaction that requires access to any memory device 321 or any cache. When any processing node performs a memory transaction, the processing node issues a snoop message (or equivalently, snoop request) on network 321 to request all of the other processing nodes to verify or update the coherency states of the data items in their respective local caches. I/O controllers 327 also issues and receives snoop messages when performing a direct memory access (DMA). Thus, any of processing nodes 323 and I/O controllers 327 may be a requesting node for a snoop message and a destination node for another snoop message.

When a first processing node sends a snoop message to a second processing node which is not directly connected to first processing node, the first and second processing nodes use a third processing node as a forwarding node. In this scenario, a third processing node serves as a forwarding node that forwards the snoop message to both processing the first and second processing nodes. The forwarding may be performed by a fan-out mechanism which replicates the incoming snoop message and forwards the replicated messages to different destinations.

Figure 4:
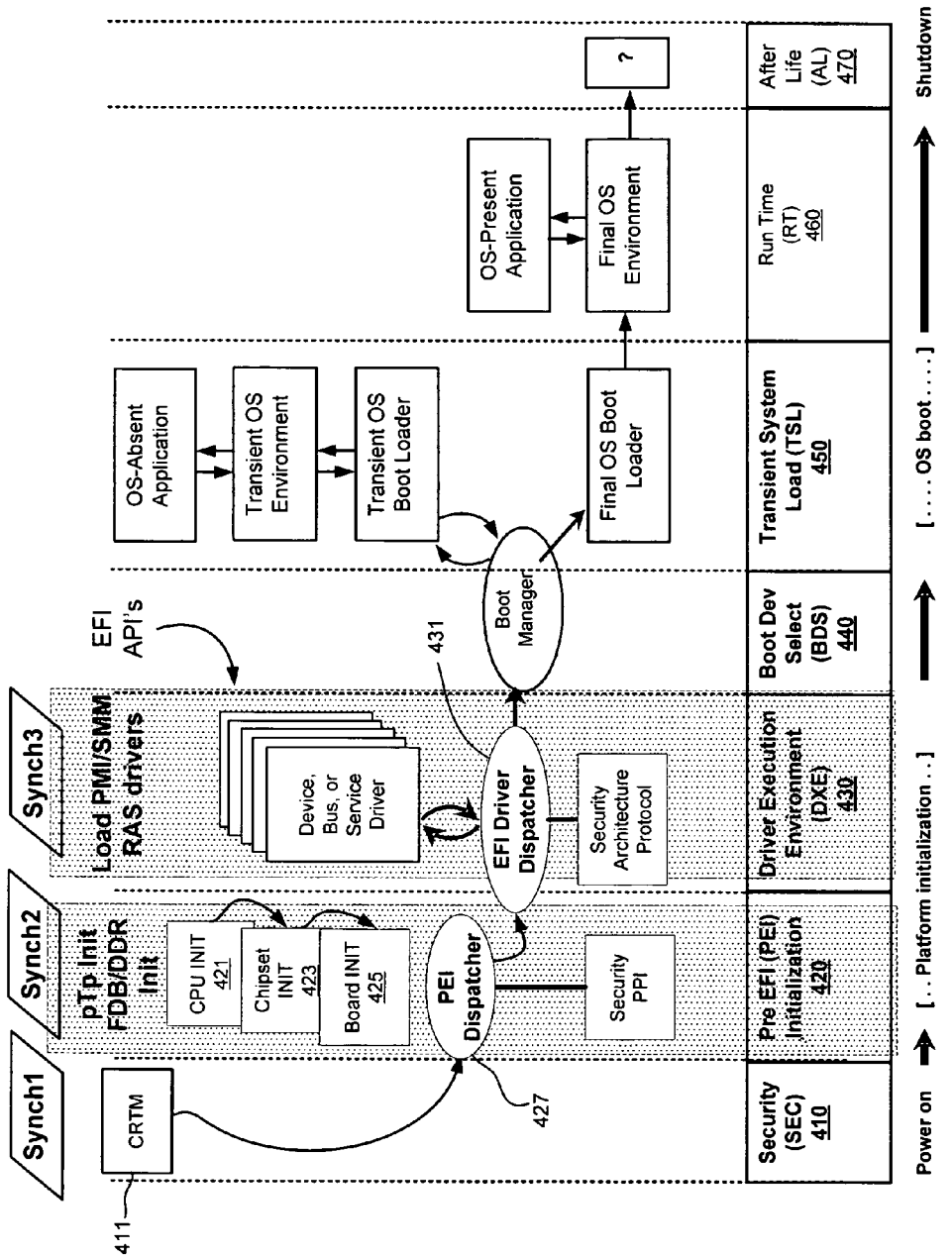
FIG. 4 is a block diagram showing the flow of execution of a system according to an embodiment of the invention.

Referring now to FIG. 4, there is shown an illustration of the flow of execution of a system according to an embodiment of the invention. For purposes of discussion, focus will be on the processes required to boot the platform.

In existing multi-core systems, one processor is chosen to boot the platform, called the boot strap processor (BSP). Upon boot, the BSP will serially perform all boot tasks. Typically, in a platform having an extensible firmware interface (EFI) architecture, the security processing (SEC) 410 phase at "synch1" is executed during early boot.

A pre-verifier, or Core Root of Trust for Measurement (CRTM) 411 may be run at power-on and SEC phase 410. A pre-verifier is typically a module that initializes and checks the environment. In existing systems, the pre-verifier and SEC phase is the Core Root of Trust for Measurement (CRTM), namely enough code to startup the Trusted Platform Module (TPM) and perform a hash-extend of BIOS. More information on TPMs may be found at URL www*trustedcomputinggroup*org. The CRTM 411 launches the pre-EFI initialization (PEI) dispatcher 427 in the PEI phase 420, shown at "synch2." Note that periods have been replaced with asterisks in URLs in this document to avoid inadvertent hyperlinks.

The processor 421, chipset 423 and board 425 may be initialized in the PEI stage 420. After PEI, the EFI Driver Dispatcher 431 and Intrinsic Services are launched securely in the driver execution environment (DXE) 430. Typically, the PEI dispatcher 427 launches the EFI driver dispatcher 431. The operations at the PEI phase 420 may be run from caches as RAM (CRAM) before proceeding to the driver execution environment (DXE) phase 430, shown at "synch3." The OS boots at the transient system load (TDL) stage 450.

The boot device select (BDS) phase 440 is responsible for choosing the appropriate operating system. Upon a system failure during OS runtime (RT phase 460), such as what is referred to as BSOD (Blue Screen Of Death) in Windows® or Panic in Unix/Linux, the firmware PEI and DXE flows may be reconstituted in an after life (AL phase 470) in order to allow OS-absent recovery activities.

Bringing the platform to a full EFI runtime environment on each compute node has been typically done serially, by the BSP. For purposes of the discussion, a compute node may be a single socket or a collection of four sockets. In embodiments of the present invention, parallel processing among the cores is enabled during boot to launch multiple EFI instances among the compute nodes. In existing systems, this was typically performed serially, and late in the boot process. In the discussion below, a compute node is typically referring to one socket. Each socket may have multiple cores, however, only one instance of EFI will run on each socket.

A policy may exist from the platform administrator to define 32 processors, but 16 are to be booted on one OS and the other 16 are to boot with another OS, for instance utilizing a hardware partition. DXE drivers may communicate with one another to implement the platform policy decisions. By deferring synchronization late into the DXE phase, policy decisions and partitioning can be made more efficiently. In existing systems the join (non-partitioned) or split (partitioned) is performed early in the PEI phase.

Figure 5:
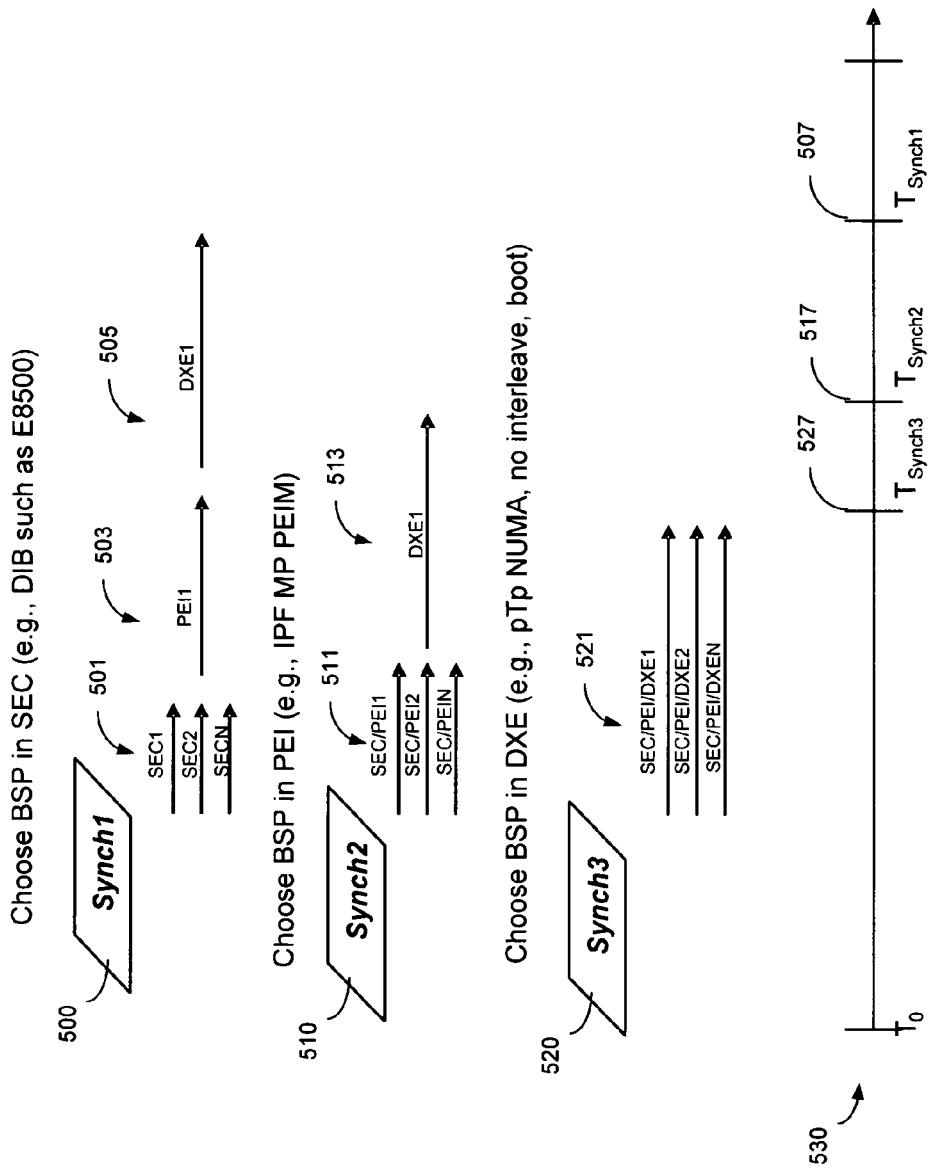
FIG. 5 illustrates a timeline with synchronization points illustrating execution of an embodiment of the invention, a compared to the prior art.

Referring now to FIG. 5, there is shown a timeline with synchronization points illustrating execution of an embodiment of the invention. The Synch1 timeline 500 illustrates an existing system with a dual independent bus (DIB) chipset such as the Intel® E8500 chipset running on a Xeon® processor. In this instance, Security (SEC) procedures and CRTM are run on each processor in the SEC phase 501. Before leaving the SEC phase a BSP is selected. The PEI phase 503 then executes and transitions to the DXE phase 505, running only on the BSP.

The Synch2 timeline 510 illustrates boot phases, for instance in a point to point (pTp) interconnect architecture platform. This process may be used in some multi-processors in the Itanium Processor Family (IPF), e.g., IPF MP PEIM, or IPF multi-processor PEI for multi-processors. In this instance, SEC and PEI phases 511 are performed in each compute node, individually. Specifically, the chipset initialization, board initialization and PEI dispatcher are performed in each compute node. pTp initialization, including initializing fully buffered DIMM (FBD) memory and double data rate (DDR) memory are performed for each compute node. This initialization is necessary because in a pTp architecture, each processor typically has its own memory. Before the SEC/PEI phase 511 is completed, a BSP is selected from one of the compute nodes. The DXE phase 513 is then performed only by the BSP.

The Synch3 timeline 520 illustrates boot phases according to an embodiment of the invention. In this instance, the SEC, PEI and DXE phases 521 are performed on each compute node. DXE processes include loading processor management interrupt (PMI) drivers (e.g., for Itanium processors), loading system management mode (e.g. for X86 processors) and reliability, availability and serviceability (RAS) drivers. Before completing the DXE phase, a BSP is selected. Thus, tasks that required serial execution on a BSP in existing systems may now be performed in parallel on all compute nodes to provide a faster boot. As can be seen in the timeline comparison 530, boot initialization for a platform operating under the Synch1 architecture does not complete until $T_{synch1}$ at 507; boot initialization for a platform operating under the Synch2 architecture does not complete until $T_{synch2}$ at 517; and boot initialization for a platform operating under the Synch3 architecture, according to embodiments of the invention, reduces boot time and will complete at $T_{synch3}$ at 527.

Figure 6:
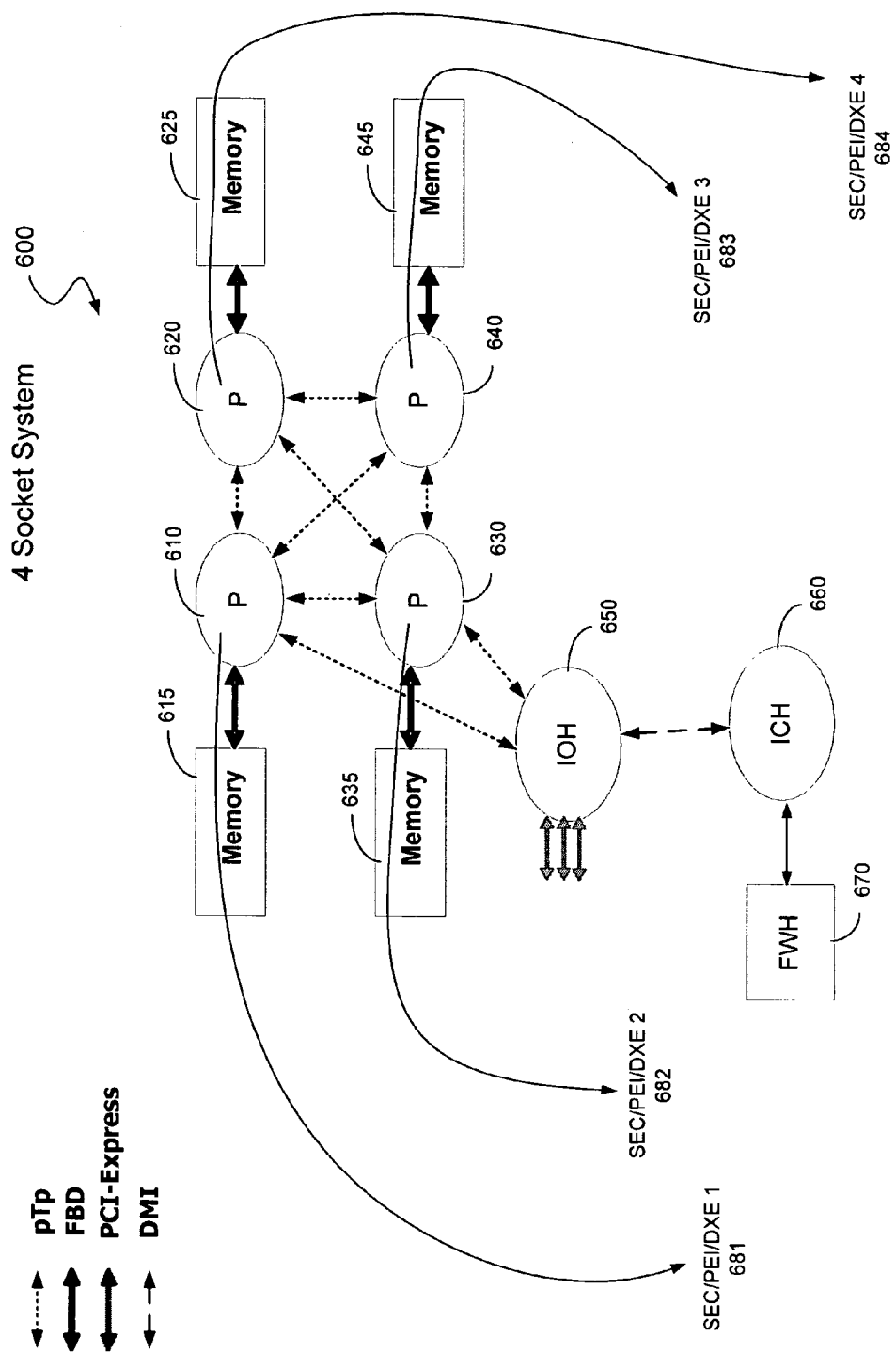
FIG. 6 illustrates a four-socket system, according to embodiments of the invention.

FIG. 6 illustrates a four-socket system 600 according to embodiments of the invention. Processors 610, 620, 630 and 640 may include any number of cores. Each of the processors 610, 620, 630 and 640 has a memory coupled to it, 615, 625, 635 and 645, respectively. The dotted lines between processors indicated a pTp interconnect bus. The bolded lines between a processor and its memory indicate a FBD connection. Some of the processors, 610 and 630 in this example, may be connected to an input/output hub (IOH) 650 via the pTp interconnect bus. The IOH 650 may be coupled with a number of devices (not shown) via a number of peripheral component interconnect express (PCI-e) buses, as indicated by grey lines. The IOH 650 is coupled to the input/output controller hub (ICH) 660, via a direct media interface (DMI) bus, as shown with dashed lines. The ICH 660 may be coupled to a firmware hub (FWH) 670.

In this exemplary embodiment, each processor/memory pair is a compute node in a socket. Each computer node executes the boot phases SEC/PEI/DXE 1-4 (681-684),as discussed above for Synch3 phase architecture 520. Once the SEC/PEI.DXE 1-4 phases are completed for each compute node, the boot device select (BDS) phase 440 may commence. The BDS phase 440 is where partitioning and boot decisions are to be made, and where the compute nodes may be joined. For instance, if the platform policy requires only one instance of Microsoft® Windows® to run on the platform, only one processor will boot Windows®. In BDS 440, one processor, for instance 610 collects data from the other processors 620, 630 and 640 and then processor 610 boots the system and launches Windows®.

Figure 7:
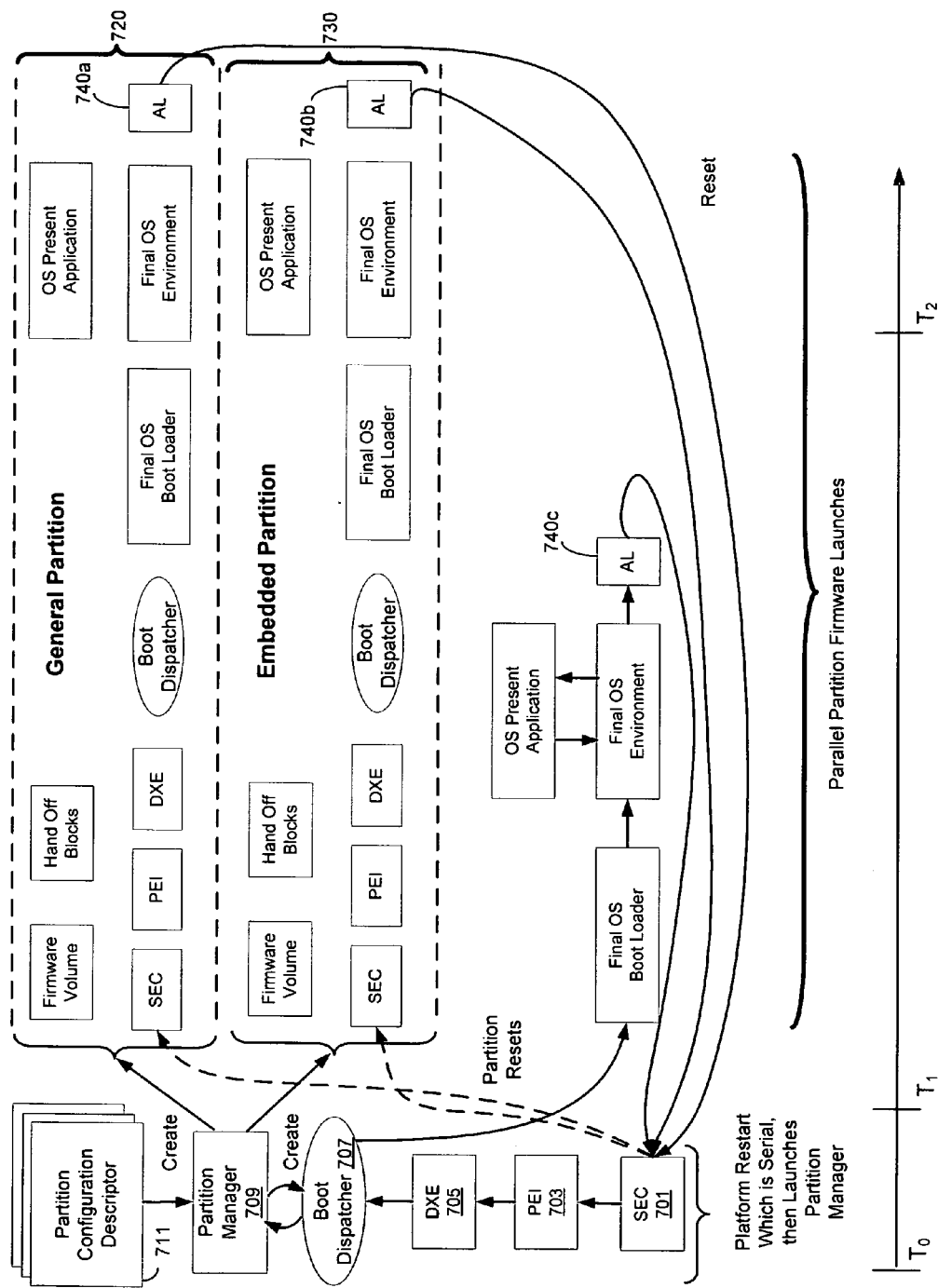
FIG. 7 illustrates an example of non-parallelized partitioning during a boot.

FIG. 7 shows an example of non-parallelized partitioning during a boot. The vertical path on the left shows The SEC phase 701 transitioning to the PEI 703 and DXE 705 phases, serially, as in the prior art. The DXE phase 705 transitions to the boot dispatcher 707. The boot dispatcher launches the partition manager 709 which retrieves configuration information from the partition configuration descriptor 711.

In this example, the partition manager creates a general partition 720 and an embedded partition 730. The partitions are created late in the boot cycle and most operations are performed serially. In a four socket system, one embodiment partitions sockets 1 and 2 in the general partition and sockets 3 and 4 in the embedded partition. Once the partitions have been created, the SEC 701 re-launches the firmware so that individual SEC/PEI/DXE processes can execute in each partition. Once the partitions have completed their own boot cycles, the boot dispatcher 707 launches the final OS boot loader. Upon a system failure during OS runtime, the after life (AL phase 740*a-c*) will return control to the SEC phase 701 to reset the system and allow a reboot or to allow OS-absent recovery activities. Partitioning may be implemented in either hardware (aka, "chipset partitioning") or software (aka, "sequestering").

Figure 8:
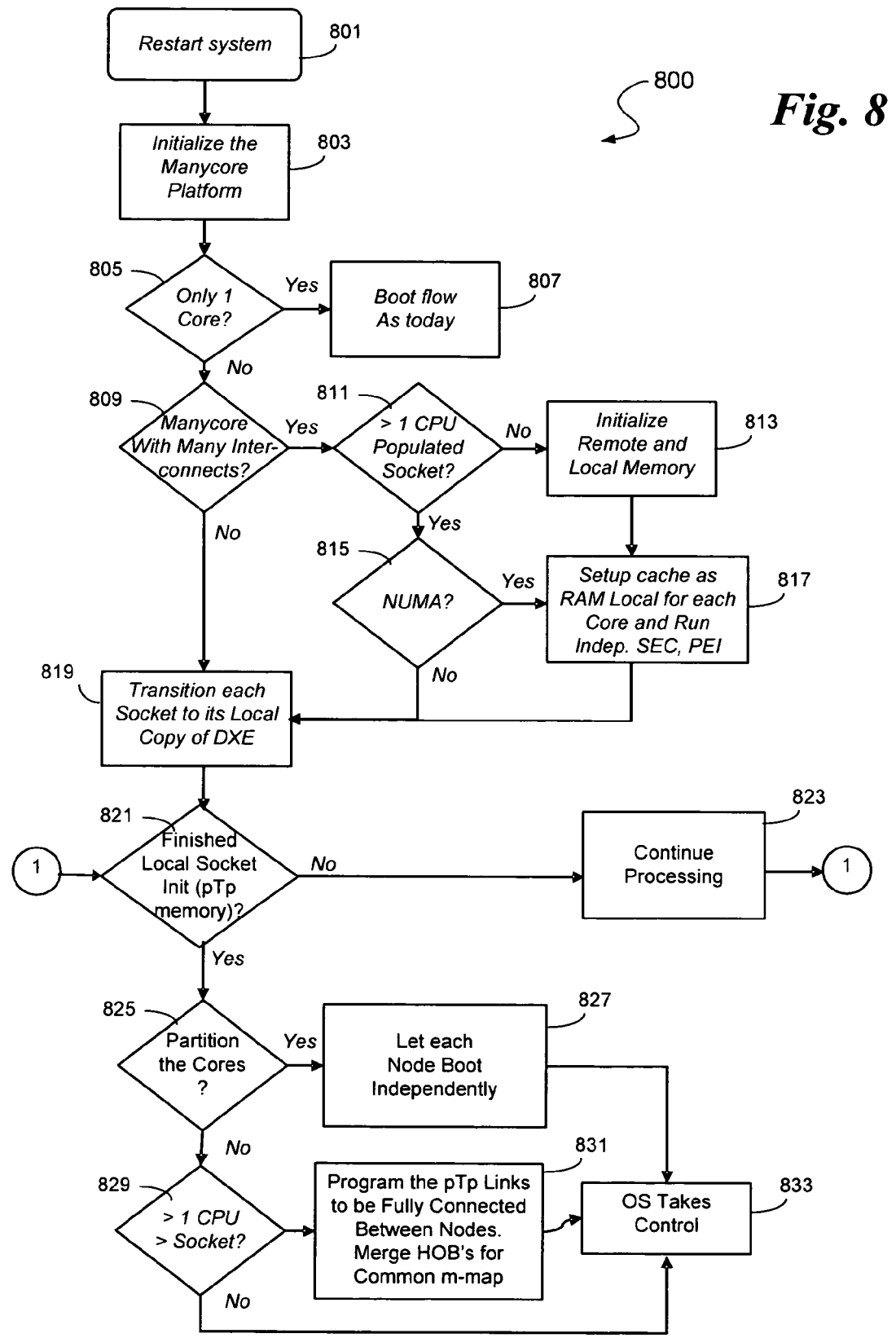
FIG. 8 illustrates an exemplary method for parallelizing boot phases in a multi-processor/manycore platform, according to an embodiment of the invention.

Referring now to FIG. 8, there is shown an exemplary method 800 for parallelizing boot phases in a multi-processor/manycore platform, according to an embodiment of the invention. The system is restarted in block 801. Initialization of the platform begins in block 803. If there is only one core in the platform, as determined in decision block 805, then the boot flow continues as in the prior art, i.e., serially on one processor. If there is more than one core, then it is determined whether the platform is a manycore with many interconnects architecture, e.g., pTp architecture, in block 809. If so, then some additional memory initialization tasks must be performed.

In some embodiments, a multi-socket pTp architecture platform may have only one compute node (socket) with a processor/memory pair. In this embodiment, other sockets may contain only memory and an associated memory controller, but no processor. This memory is considered "remote" to the processor in the system. Memory locally coupled to the processor in a socket is considered "local" memory to that socket.

When a platform has only one processor, but contains sockets with only memory, as determined in block 811, then the remote and local memory is initialized by the one processor in block 813. The processor then sets up cache as RAM local for each core and runs independent SEC/PEI in block 817. If there is more than one processor socket, then it must be determined whether Non-Uniform Memory Access (NUMA) is to be employed or whether interleaving is to be employed, in decision block 815. If NUMA is employed, then the processor then sets up cache as RAM local for each core and runs independent SEC/PEI in block 817.

Processing continues at block 819 for all cases, where each socket is transitioned to its local copy of DXE. A determination is made as to whether the local socket has finished initializing pTp memory, in decision block 821. If not, processing continues until memory initialization is complete.

Once memory has initialized, a determination is made as to whether the platform processors are to be partitioned, in decision block 825. In some embodiments, this determination and execution is performed at the boot device select (BDS) phase, and BDS calls EFI drivers to effect the merging or partitioning. At this point, the compute nodes have booted and initialized independently, in parallel. If they are to be partitioned separately, then each node is allowed to complete its boot independently, in block 827. Once fully booted, the OS takes control in block 833.

If partitioning is not desired, as indicated in block 825, then it is determined whether there is more than one processor in more than one socket, in decision block 829. If not, then only one core/node needs to be booted anyway, and once complete, the OS takes control in block 833.

When there is more than one processor in more than one socket, the pTp links are to be programmed to be fully connected between nodes, in block 831. The hand-off blocks (HOBs) for each node are merged and a common memory map is generated. Once the links and interconnects between and among all of the compute nodes and memory have been established and the boot is complete, the OS takes control in block 833. It will be apparent to one of skill in the art that only partial partitioning may be desired in a platform. In this case, blocks 825-827-833 and 825-829-831-833 are somewhat merged in that partitioned nodes boot independently, but multiple nodes within a partition require the merging of HOBs and memory maps. It will be apparent to one of skill in the art that the merging process may be altered based on platform partitioning policy.

Running parallel boot phases on each compute node enables partition readiness in the platform. Once the parallel booting is complete, each partition proceeds to launch its own OS and no further action is required. In many cases full hardware partitioning is preferable to software partitioning because it is more secure. However, embodiments of the present invention may be implemented with software sequestering. In systems deployed on a pTp interconnect architecture platform, a compute node may be purposely left unconnected with other specific compute nodes to ensure secure partitioning. Policies to effect this may be programmed into the platform firmware.

Embodiments of the present invention may be more fault tolerant than existing systems. Because booting is performed in parallel on each compute node, errors or failure of a compute node may be detected before the nodes are fully joined or partitioned. Platform policy may dictate what corrective action is to be taken in the event of a node failure. Thus, if one or more parallel boot agent fails, booting can still complete with subsequent OS launch(es).

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for parallelized boot in a multi-processing platform, comprising:
   a plurality of compute nodes each having associated memory;
   at least one compute node having an associated processor, the processor having multiple cores;
   a point to point (pTp) interconnect bus to allow communication from the plurality of compute nodes to an input output hub (IOH); and
   a firmware hub comprising memory, the memory having boot phase instructions stored therein, the boot phase instructions comprising at least a security phase (SEC), a pre-extensible firmware interface (EFI) initialization phase (PEI), and a driver execution environment (DXE) phase,
   wherein upon boot, the SEC, PEI and DXE phase instructions are to execute on each compute node having an associated processor, the execution to be in parallel.

2. The system as recited in claim 1, further comprising boot device select (BDS) logic to merge or partition the compute nodes based on a predetermined platform policy.

3. The system as recited in claim 2, wherein the BDS logic is to retrieve hand off block (HOB) information resulting from the boot phases executed on each compute node having an associated processor, the HOB information used to implement the platform policy, and the BDS to create a common memory map from memory associated with the plurality of compute nodes.

4. The system as recited in claim 2, wherein at least one compute node comprises associated memory and memory controller, but no associated processor.

5. The system as recited in claim 2, wherein if one or more compute nodes fails during boot, the platform policy is to dictate an alternative configuration of the platform omitting the failed one or more compute nodes from the alternative configuration.

6. The system as recited in claim 2, wherein upon completion of executing the SEC, PEI and DXE phase instructions in parallel on the platform, each compute node having an associated processor is to have an instance of an extensible firmware interface (EFI) code and drivers executing on each associated processor, wherein each compute node corresponds to a single socket on the platform.

7. The system as recited in claim 6, wherein the platform policy dictates that each compute node is to execute in a separate partition, and wherein each compute node may launch an operating system at completion of execution of the parallel boot phases.

8. The system as recited in claim 1, wherein the pTp interconnect bus enables a fully connected network of compute nodes.

9. The system as recited in claim 1, wherein the pTp interconnect bus enables a partially connected network of compute nodes, where unconnected compute nodes are partitioned separately, and enable secure partitioning.

10. A method for parallelized boot in a platform, having a plurality of compute nodes comprising:
  booting the platform; and
  executing security (SEC), pre-EFI initialization (PEI) and driver execution environment (DXE) boot phases in parallel on each compute node having a processor in the platform, wherein each compute node has an associated socket in the platform, and wherein the plurality of compute nodes communicate via a point to point (pTp) interconnect network.

11. The method as recited in claim 10, further comprising:
  merging and partitioning the plurality of compute nodes by boot device select logic (BDS) based on a predetermined platform policy.

12. The method as recited in claim 11, further comprising:
  executing boot device select logic to retrieve hand off block (HOB) information resulting from the parallel running boot phases;
  implementing the platform policy based on the HOB information; and
  generating a common memory map from memory associated with the plurality of compute nodes.

13. The method as recited in claim 11, further comprising generating an alternative configuration of the platform when one or more compute nodes fails during boot, omitting the failed one or more compute nodes from the alternative configuration, wherein the alternative configuration is derived from the platform policy.

14. The method as recited in claim 10, wherein at least one compute node comprises associated memory and memory controller, but no associated processor.

15. The method as recited in claim 10, wherein the pTp interconnect network enables a fully connected network of compute nodes.

16. The method as recited in claim 10, wherein the pTp interconnect network enables a partially connected network of compute nodes, where unconnected compute nodes are partitioned separately, and enable secure partitioning.

17. The method as recited in claim 10, further comprising:
  after executing the SEC, PEI and DXE boot phases, instantiating extensible firmware interface (EFI) code and drivers on each compute node having an associated processor.

18. The method as recited in claim 17, further comprising launching an operating system (OS) on each partitioned compute node at completion of execution of the parallel boot phases, wherein the platform policy dictates that each compute node is to execute in a separate partition.

19. A machine readable storage medium having instructions for parallelized boot in a platform having a plurality of compute nodes, the instructions stored therein, when executed on a machine, cause the machine to:
  boot the platform; and
  execute security (SEC), pre-EFI initialization (PEI) and driver execution environment (DXE) boot phases in parallel on each compute node having a processor in the platform, wherein each compute node has an associated socket in the platform, and wherein the plurality of compute nodes communicate via a point to point (pTp) interconnect network.

20. The medium as recited in claim 19, further comprising instructions to:
  merge and partition the plurality of compute nodes by boot device select logic (BDS) based on a predetermined platform policy.

21. The medium as recited in claim 20, further comprising instructions to:
  execute boot device select logic to retrieve hand off block (HOB) information resulting from the parallel running boot phases;
  implement the platform policy based on the HOB information; and
  generate a common memory map from memory associated with the plurality of compute nodes.

22. The medium as recited in claim 20, further comprising instructions to generate an alternative configuration of the platform when one or more compute nodes fails during boot, omitting the failed one or more compute nodes from the alternative configuration, wherein the alternative configuration is derived from the platform policy.

23. The medium as recited in claim 19, wherein at least one compute node comprises associated memory and memory controller, but no associated processor.

24. The medium as recited in claim 19, wherein the pTp interconnect network enables a fully connected network of compute nodes.

25. The medium as recited in claim 19, wherein the pTp interconnect network enables a partially connected network of compute nodes, where unconnected compute nodes are partitioned separately, and enable secure partitioning.

26. The medium as recited in claim 19, further comprising instructions to:
  after executing the SEC, PEI and DXE boot phases, instantiate extensible firmware interface (EFI) code and drivers on each compute node having an associated processor.

27. The medium as recited in claim 26, further comprising instructions to launch an operating system (OS) on each partitioned compute node at completion of execution of the parallel boot phases, wherein the platform policy dictates that each compute node is to execute in a separate partition.

* * * * *